United States Patent [19]
Hassenrück et al.

[11] Patent Number: 5,637,679
[45] Date of Patent: Jun. 10, 1997

[54] AZO DYESTUFFS FOR DYEING AND PRINTING CELLULOSE-CONTAINING FIBER MATERIALS IN AN INK JET PROCESS

[75] Inventors: Karin Hassenrück, Düsseldorf; Peter Wild; Frank-Michael Stöhr, both of Odenthal, all of Germany

[73] Assignee: Bayer Aktiengesellschaft, Leverkusen, Germany

[21] Appl. No.: 471,435

[22] Filed: Jun. 7, 1995

[30] Foreign Application Priority Data

Jul. 12, 1994 [DE] Germany ............... 44 24 484.3

[51] Int. Cl.$^6$ ................................. C09B 31/08
[52] U.S. Cl. .................. 534/691; 534/796; 534/805; 106/31.48; 106/31.52
[58] Field of Search ........................ 534/691, 796, 534/805; 106/22 K

[56] References Cited

U.S. PATENT DOCUMENTS

| | | | |
|---|---|---|---|
| 4,804,411 | 2/1989 | Eida et al. | 106/22 K |
| 5,213,614 | 5/1993 | Eida et al. | 106/22 K |
| 5,258,505 | 11/1993 | Eida et al. | 534/680 |
| 5,480,478 | 1/1996 | Sano | 106/22 K |

FOREIGN PATENT DOCUMENTS

| | | |
|---|---|---|
| 0356080 | 2/1990 | European Pat. Off. . |
| 3535661 | 4/1987 | Germany . |
| 3-115363 | 5/1991 | Japan . |

OTHER PUBLICATIONS

Derwent Abstract of JP 62–124,168, (Jun. 5, 1987).
Derwent Abstract of JP 03–115,363, (May 16, 1991).
Derwent Abstract of JP 03–100,081, (Apr. 25, 1991).
Patent Abstracts of Japan, vol. 15, No. 313, abstract of JP 03–115,363, (1991).
Patent Abstracts of Japan, vol. 15, No. 285, abstact of JP 03–100,081, (1991).

Primary Examiner—Jacqueline Haley
Attorney, Agent, or Firm—Sprung Horn Kramer & Woods

[57] ABSTRACT

New azo dyestuffs of the formula (I)

$$\left[ [X]_a - \left( \begin{array}{c} OH \\ N=N- \underset{SO_3H}{\underbrace{\phantom{XXXX}}} -N=N- \underset{(SO_3H)_n}{\underbrace{\phantom{XXXX}}} \underset{SO_3H}{\overset{NH-}{\underbrace{\phantom{XXXX}}}} -[Y]_c \\ (NH_2)_n \end{array} \right) \right]_b \quad (I)$$

wherein
n in each case independently of one another represents 0 or 1,
a, b and c independently of one another denote 1 or 2, $a+c<4$, $a+b+c=3$ or $5$ and
X and Y denote different mono- or bivalent radicals,
a process for their preparation and their use for dyeing and printing cellulose-containing fibre materials, in particular paper by means of the ink jet process, have been found.

11 Claims, No Drawings

AZO DYESTUFFS FOR DYEING AND PRINTING CELLULOSE-CONTAINING FIBER MATERIALS IN AN INK JET PROCESS

Black polyazo dyestuffs for ink jet printing are already known from DE-A 35 35 661, EP 356 080, JP-A-31 15 363 and JP-A-3 100 081. However, it was applicable to improve their use properties.

The invention relates to azo dyestuffs of the general formula (I)

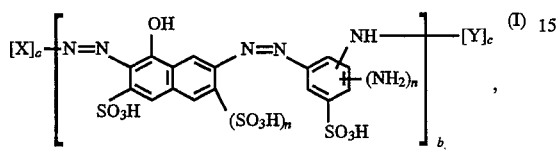

wherein

X denotes a radical of the formula (II)

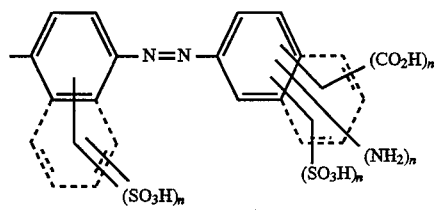

or represents a bivalent radical and

Y represents a monovalent radical of the formula III

or represents a bivalent radical of the formulae IV to VIa

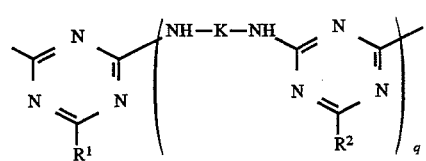

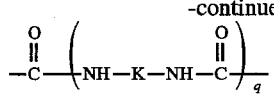

wherein n in each case independently of one another represents 0 or 1, q denotes 0 or 1, $R^1$ and $R^2$ independently of one another represent halogen, hydroxyl, $C_1$–$C_4$-alkoxy or optionally substituted amine, K denotes $C_1$–$C_6$-alkylene, $C_2$–$C_6$-alkylidene, $C_6$–$C_{10}$-arylene, hetarylene, two $C_6$–$C_{10}$-arylene units which are independent of one another and are bonded directly to one another or are interrupted by hetarylene, $C_1$–$C_6$-alkylene, $C_2$–$C_6$-alkylidene or hetero atoms, or two $C_1$–$C_6$-alkylene and/or $C_2$–$C_6$-alkylidene units which are independent of one another and are bonded directly to one another or interrupted by hetarylene, $C_6$–$C_{10}$-arylene or hetero atoms, a, b and c independently of one another denote 1 or 2, a+c<4, a+b+c=3 or 5 and the free valencies of the radical X are in each case linked to the azo group and those of the radical Y are in each case linked to the amino group of the bivalent radical with the index b.

Preferred dyestuffs of the formula I are those of the formula VII

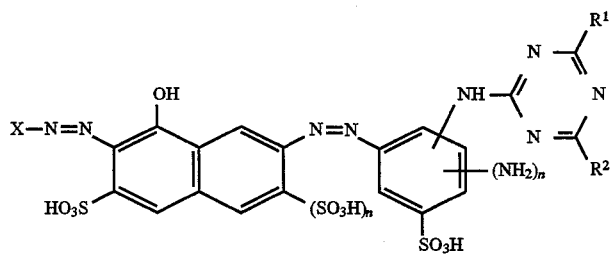

wherein $R^1$ and $R^2$ independently of one another denote a substituted or unsubstituted amine and the monovalent radical X has the above meaning.

Dyestuffs of the formula I which are likewise preferred are those which correspond to the formula VIII

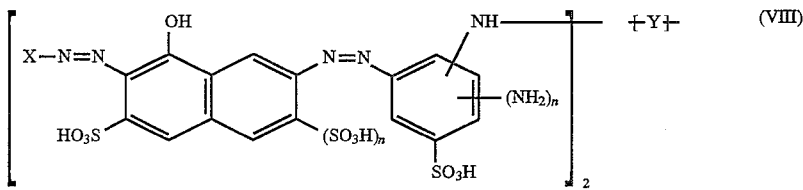

wherein

X has the above meaning of the monovalent radical and

Y has the above meaning of the bivalent radical, and dyestuffs of the formula I which correspond to the formula IX

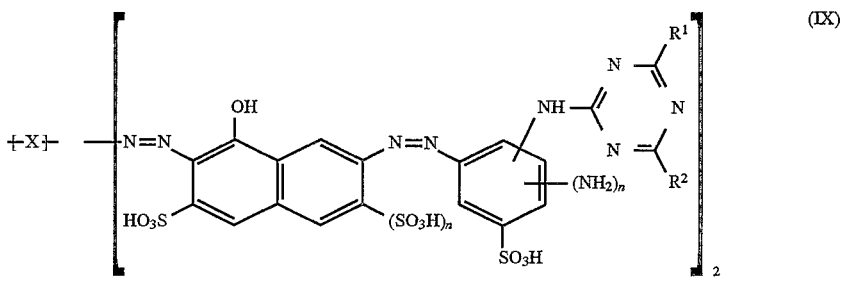

wherein $R^1$ and $R^2$ independently of one another represent an unsubstituted or substituted amine and X has the above meaning of the monovalent radical.

Particularly preferred dyestuffs of the formula I are those wherein

X represents a monovalent radical of the formulae IIa–IIf

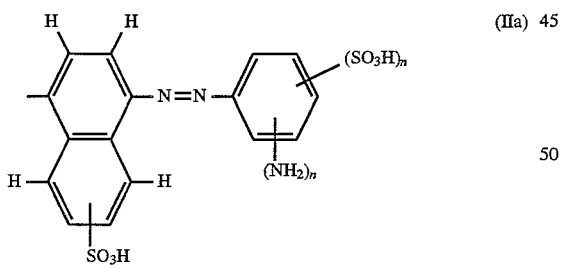

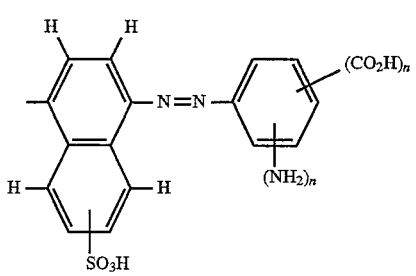

-continued

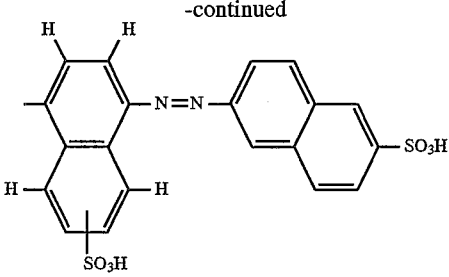

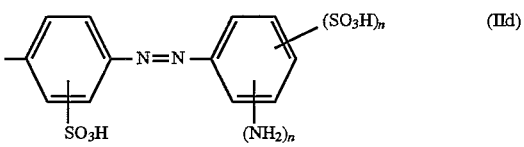

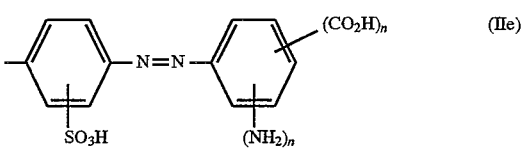

or represents a bivalent radical K, wherein

K represents —CH=CH—, $CH_2$, $C_2H_4$, or phenylene or naphthylene which are unsubstituted or substituted by $SO_3H$, $C_1$–$C_4$-alkyl, $CO_2H$ and/or $NH_2$, or a 5- or 6-membered heterocyclic ring which contains one or more, in particular 1 to 3, oxygen atoms and/or 1 to 3 nitrogen atoms as hetero atoms, two phenylene or naphthylene units which are unsubstituted or substituted independently of one another by $SO_3H$, $CO_2H$, $C_1$–$C_4$-alkyl and/or $NH_2$ and are bonded directly to one another or interrupted by a bivalent heterocyclic 5- or 6-membered ring which contains as hetero atoms one or more, in particular 1–3, oxygen atoms and/or 1–3 nitrogen atoms, by an optionally branched $C_1$–$C_6$-alkylene, in particular $C_2H_4$, an optionally branched $C_2$–$C_6$-alkylidene, in particular —CH=CH—, or by hetero atoms, such as O, S, NH, —NHCO— or a radical of the formula

—NH—W—NH— wherein W denotes

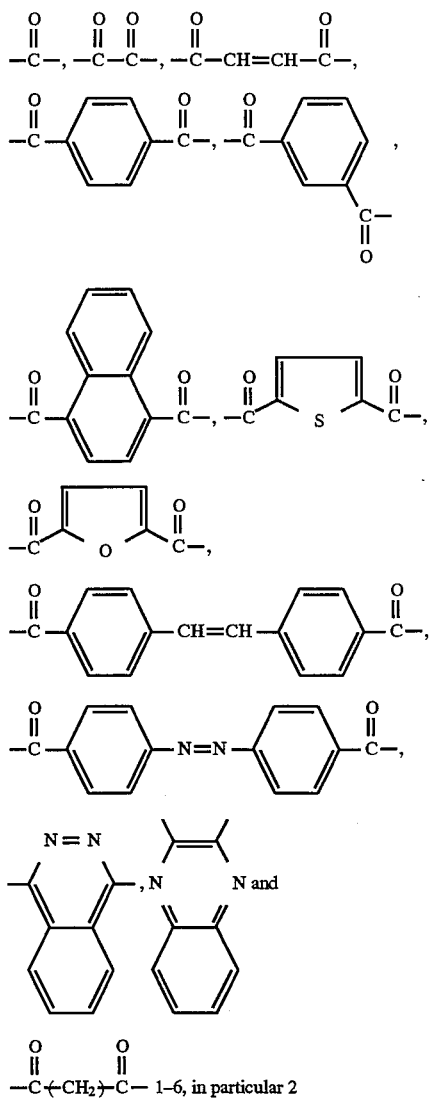

—C(̵CH$_2$)̵C— 1–6, in particular 2 or represents $C_1$–$C_6$-alkylene which is interrupted by $C_6$–$C_{10}$-arylene, in particular phenylene or naphthylene.

Dyestuffs of the formula I which are likewise particularly preferred are those wherein Y represents a monovalent radical of the formula III wherein $R^2$ and $R^2$ independently of one another denote fluorine, chlorine, bromine or an amino group of the formula $NR^3R^4$, wherein $R^3$ denotes H or a $C_1$ $C_{10}$-alkyl, $C_1$–$C_{10}$-cycloalkyl or $C_6$–$C_{10}$-Ar-$C_1$–$C_{10}$-alkyl radical which is unsubstituted or substituted by carboxyl, hydroxyl, amino, sulpho, sulphato and/or $C_1$–$C_4$-alkoxy, $R^4$ has the meaning of $R^3$ or represents a $C_6$–$C_{10}$-aryl radical which is unsubstituted or substituted by hydroxyl, carboxyl, sulpho, $C_1$–$C_4$-alkyl and/or $C_1$–$C_4$-alkoxy, or $R^3$ and $R^4$, together with the nitrogen atom to which they are bonded, form a heterocyclic 5- or 6-membered ring, which optionally contains a further hetero atom, or Y represents a bivalent radical of the formula IV, V, VI or VIa, wherein the radicals K, $R^1$ and $R^2$ have the abovementioned preferred meanings.

Especially preferred dyestuffs of the formula I are those wherein $R^1$ and $R^2$ independently of one another represent $NR^3R^4$, wherein $R^3$ denotes hydrogen or $C_1$–$C_6$-alkyl or cycloalkyl which are unsubstituted or substituted by carboxyl, hydroxyl, amino, sulpho, sulphato or $C_1$–$C_4$-alkoxy and $R^4$ denotes hydrogen, $C_1$–$C_6$-alkyl which is unsubstituted or substituted by hydroxyl, phenyl, naphthyl, $C_1$–$C_4$-alkoxy, sulphato, sulphoamino or carboxyl, or phenyl or naphthyl which are unsubstituted or substituted by one or two substituents from the group consisting of hydroxyl, carboxyl, sulpho, $C_1$–$C_4$-alkyl and $C_1$–$C_4$-alkoxy, or wherein $R^3$ and $R^4$, together with the nitrogen atom to which they are bonded, form a heterocyclic 5- or 6-membered ring which contains one or two hetero atoms, in particular nitrogen and/or oxygen, such as, for example, a morpholine, piperidine or piperazine ring.

Examples of optionally substituted amines of the formula —$NR^3R^4$ are $NH_2$, $NHCH_3$, $N(CH_3)_2$, $N(C_2H_5)_2$, $NHC_2H_5$, $NHCH_2CH_2OH$, $NHCH_2CH_2OCH_3$, $N(C_2H_4OH)_2$, $NCH_2CH_2OH$
                                              |
                                              $CH_3$ $NCH_2CH_2SO_3H$, $NHCH_2CH_3$, $NCH_2CH_2CH_3$,
|                               |
$CH_3$                          $CH_3$ $NCH_2CH_2OSO_3H$, $NCH_2SO_3H$, $HNCH_2CH_2OSO_3H$,
|                  |
$CH_3$             $CH_3$ $NHCH_2CH_2SO_3H$, $NHCH(CH_3)_2$, $NHCH_2CHOSO_3H$,
                                    |
                                    $CH_3$ $NHCH_2COOH$, $NCH_2COOH$, $NHCH_2CH_2COOH$,
              |
              $CH_3$ $N(C_2H_4OSO_3H)_2$, $NH(CH_2)_{10}COOH$, $NH(CH_2CH_2NH)_p$—$CH_2CH_2NH_2$ (p = 0–4),

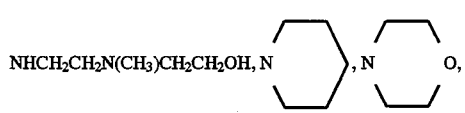

$NHCH_2CH_2N(CH_3)CH_2CH_2OH$,

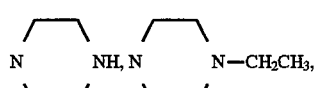

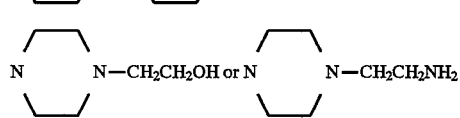

Examples of bivalent Y radicals of the formula V are
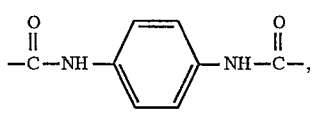
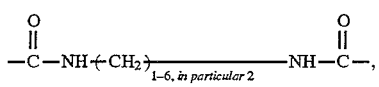
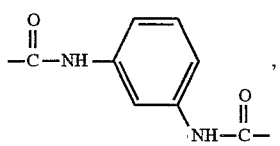
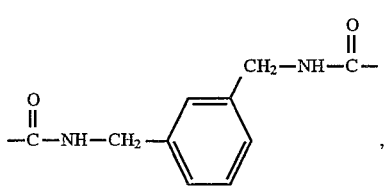
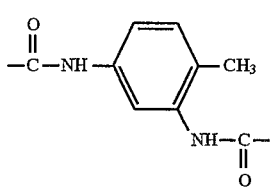
Examples of bivalent radicals of the formula K are:
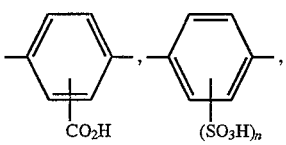
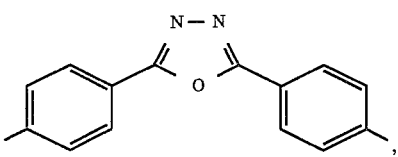
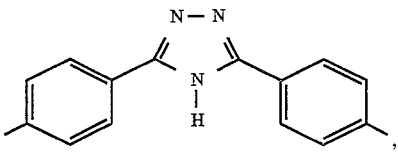
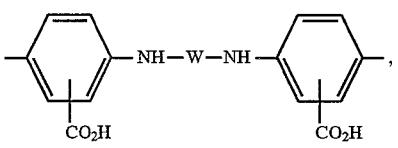
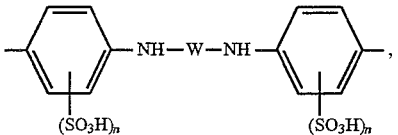
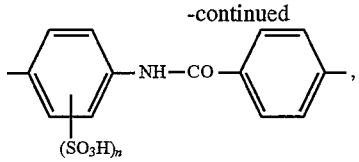
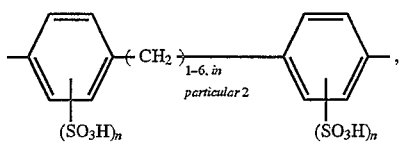
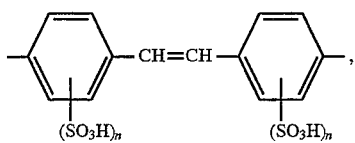
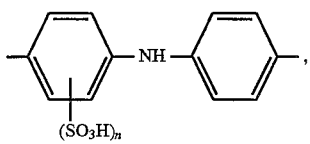
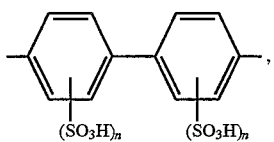
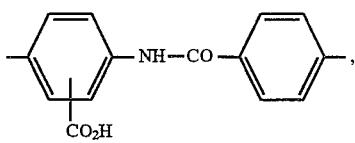
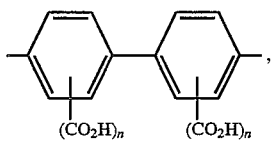
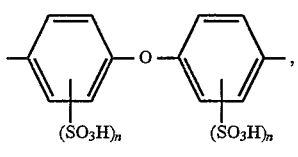
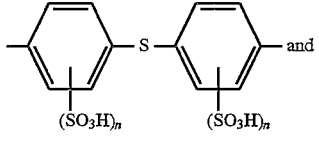
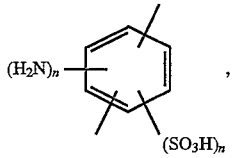
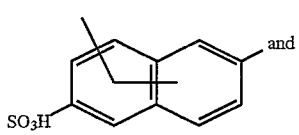

-continued

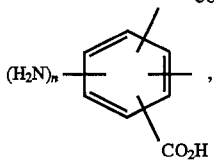

wherein where there are several substituents having the index n per molecule, n in each case independently of one another represents 0 or 1 and W represents

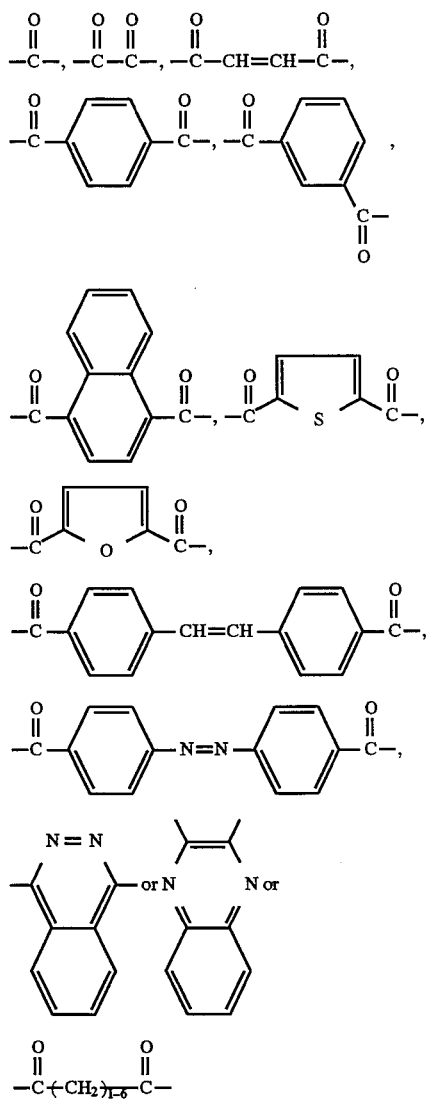

The invention furthermore relates to a process for the preparation of dyestuffs of the formula (I), characterized in that colour bases of the formula X

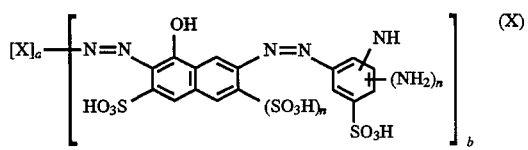

wherein
n and X have the abovementioned meanings,
a=1 and
b=1 if X represents a monovalent radical and
b=2 if X represents a bivalent radical,
are reacted with a compound of the formulae XIa–XIe

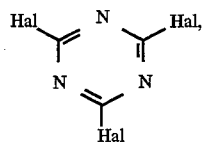 (XIa)

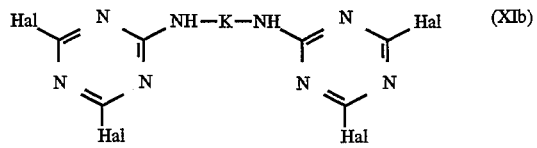 (XIb)

 (XIc)

OCN—K—NCO (XId)

or

 (XIe)

wherein
K and q have the abovementioned meanings and
Hal in each case independently of one another represents fluorine, chlorine or bromine,
and if appropriate the products are reacted further to give compounds of the formula (I) wherein $R^1$ and $R^2$ denote hydroxyl, $C_1$–$C_4$-alkoxy or a substituted or unsubstituted mine.

The condensation of the colour base X with a compound of the formulae (XIa–XIc) is preferably carried out in an aqueous or aqueous-organic medium at temperatures of 20°–60° C., the hydrogen halide acid liberated during the condensation being trapped, if appropriate.

The addition of the colour base of the formula X with a compound of the formula XId is preferably carded out in an aqueous or aqueous-organic medium at temperatures of 10°–60° C.

In the case of a reaction with compounds containing halogenotriazine, halogen can be replaced by amino or alcohol radicals of the formula $HR^1$ or $HR^2$ in a further condensation reaction, this being achieved by reaction with amine compounds of the formula $HNR^3R^4$ or $C_1$–$C_4$-alcohols.

This condensation is likewise carded out in an aqueous or aqueous-organic medium at temperatures of 60°–100° C., the hydrogen halide liberated during the condensation being neutralized by addition of acid-binding agents. Acid-binding agents are, in addition to alkali metal or alkaline earth metal bicarbonates, carbonates, hydroxides, phosphates or borates, also amines of the formula $HNR^3R^4$, which are employed in excess. In addition, tertiary amines, such as triethylamine or pyridine bases, such as pyridine, picoline or choline, can also be used.

The dyestuffs according to the invention dye cellulose-containing materials, in particular paper, cotton and viscose, as well as leather, with good wet- and light-fastnesses.

The dyestuffs can be used in all the processes customary in the paper and textile industry for direct dyestuffs, in particular in pulp and surface dyeing of paper for sized or unsized grades, starting from bleached or unbleached pulp of various origins, such as softwood or hardwood sulphite and/or sulphate pulp. They can also be used in dyeing yarn and piece goods of cotton, viscose and linen by the exhaustion process from a long liquor or in continuous processes.

The invention furthermore relates to liquid dyestuff preparations comprising at least one dyestuff of the formula (I). This use form is particularly preferred when dyeing paper. Processing into stable liquid, preferably aqueous, concentrated dyeing preparations can be carried out in the generally known manner, advantageously by dissolving in suitable solvents, if appropriate with the addition of an auxiliary, for example a hydrotropic compound or a stabilizer. The possibility of preparation of such stable aqueous concentrated preparations in the course of the dyestuff synthesis itself, without intermediate isolation of the dyestuff, is of particular advantage.

Examples of suitable hydrotropic auxiliaries are low molecular weight amides, lactones, alcohols, glycols or polyols, low molecular weight ethers or oxyalkylation products, and nitriles or esters; preferred possible auxiliaries here are methanol, ethanol and propanol; ethylene glycol, propylene glycol, diethylene glycol, thiodiethylene glycol and dipropylene glycol; butanediol; β-hydroxypropionitrile, pentamethylene glycol, ethylene glycol monoethyl and monopropyl ether, ethylene diglycol monoethyl ether, triethylene glycol monobutyl ether, butylpolyglycol, formamide, dimethylformamide, pyrrolidone, N-methylpyrrolidone, glycol acetate, butyrolactone, urea and ε-caprolactam.

The dyestuffs of the formula I can furthermore also be employed in inks in the ink jet process.

The inks in general comprise about 1 to 20% by weight of one or more dyestuffs of the formula (I), 80 to 90% by weight of water and/or polar protic or dipolar aprotic solvents, and if appropriate other customary constituents.

Preferred solvents here are polyhydric alcohols and ethers or esters thereof, carboxylic acid amides, sulfoxides and sulfones, in particular those having molecular weights of <200. Examples of particularly suitable solvents are ethylene glycol, diethylene glycol, triethylene glycol, 1,5-pentanediol, 2-hydroxyethyl acetate, 2-(2'-hydroxy)-ethyl acetate, glycerol, 1,2-dihydroxypropane, 1-methoxy-2-propanol, 2-methoxy-1-propanol, N,N-dimethylformamide, pyrrolidone, ε-caprolactam, N-methylcaprolactam, tetramethylurea, 1,3-dimethyl-2-imidazolidinone, N,N'-dimethylpropyleneurea, dimethyl sulphoxide, dimethyl sulphoxide, dimethyl sulphone and sulpholane.

Inks having the following composition are preferred:

0.5 to 20% by weight of one or more dyestuffs according to the invention, 50 to 99.5% by weight of water 0 to 30% by weight of one or more organic solvents and/or agents having a hydrotropic action, 0 to 30% by weight of additives which influence the viscosity and/or surface tension, the sum of the constituents mentioned making 100% by weight.

The inks can be prepared by dissolving the salts of the dyestuff (I) in water, or from the condensation solutions, which, if appropriate, are subjected to desalination, for example by pressure permeation, and/or addition of one or more of the abovementioned organic solvents, if appropriate at elevated temperatures and with the addition of inorganic and organic bases; if appropriate, customary ionic or non-ionic additives can also additionally be used, for example those with which the viscosity can be reduced and/or the surface tension increased.

Instead of the salts of (I), it is also possible to employ the corresponding free acids, in combination with at least equimolar amounts of the corresponding bases.

Inorganic bases which can be employed are, for example, lithium hydroxide, sodium hydroxide, potassium hydroxide, lithium carbonate, sodium carbonate and potassium carbonate.

Organic bases which can be used are, for example, ethanolamine, diethanolamine, triethanolamine, N-methylethanolamine, N,N-dimethylethanolamine, N-methyldiethanolamine, 1-amino-2-propanol, 2-amino-1-propanol, 1 di-isopropanolamine, N-2-hydroxyethyl-diisopropanolamine, tris-N,N,N-[2'(2'-hydroxyethoxy)-ethyl]amine or sodium methylate, lithium ethylate or potassium tert-butylate.

The ink of the invention has the following advantages: the physical properties, such as viscosity, surface tension and the like, are in suitable ranges; the ink causes no blockages in fine discharge openings of ink jet recording devices; it produces images of high density; during storage, no change in physical properties or deposition of solid constituents occurs in the ink; the ink is suitable for recording on various recording media, without limitations with respect to the nature of the recording media; and finally, the ink is fixed rapidly and gives images having an excellent water resistance, light-fastness, abrasion resistance and resolution.

EXAMPLE 1

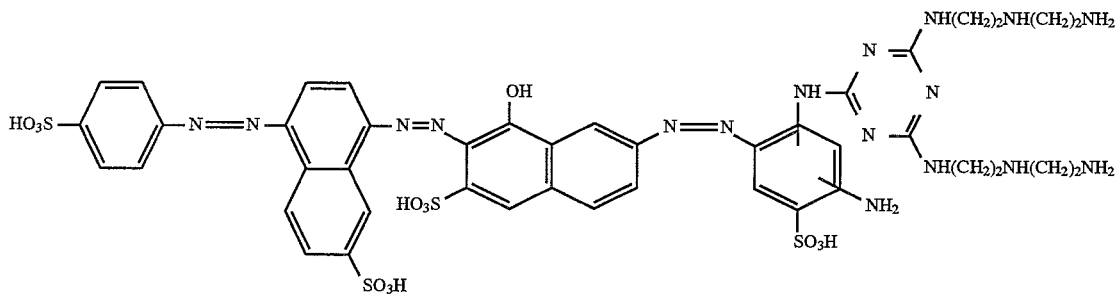

51 g of moist paste of the aminotdsazo dyestuff (30%) prepared by diazotization of sulphanilic acid and coupling to 1-aminonaphthalene-7-sulphonic acid, further diazotization and coupling to γ-acid, and further diazotization and coupling to 1,3-diaminobenzene-4-sulphonic acid are initially introduced into 150 ml of water, and 3.7 g of cyanuric chloride are introduced at 0°–5° C. At the same time, the pH is kept at pH 6 by dropwise addition of 5% strength NaOH solution. The mixture is then stirred at 0°–5° C. and pH 6 for 2.5 hours, and subsequently warmed to room temperature in the course of 30 minutes.

9.2 g of diethylenetriamine (corresponds to the part formula $HR^1$ or $HR^2$) are added to this reaction mixture. The temperature is increased to 85° C. and maintained for 30 minutes. After cooling to room temperature, the mixture is brought to pH 7 with $HCl/H_2O$ and the product is filtered off with suction, washed with $HO_2O$ and dried. 17.1 g of dyestuff are obtained, $\lambda_{max}$ ($H_2O$) 582 nm.

5 parts of this dyestuff are stirred into 80 parts of water and the pH is brought to 9.5 by addition of 2N sodium hydroxide solution. A total weight of 100 parts is established by addition of water, so that an approximately 5% strength liquid dyestuff preparation according to the invention of the above dyestuff is obtained. (γ-acid=1hydroxy-7-amino-3-naphthalenesulphonic acid)

EXAMPLE 2

A mixture of 50% bleached pine sulphate pulp and 50% bleached birch sulphate pulp is beaten at a pulp consistency of 2.5% to a degree of beating of 36° SR.

To 200 parts of this suspension, comprising 5 parts of pulp, in a glass beaker are added 20 ml of a 3% strength aqueous solution of the liquid dyestuff preparation according to the invention from Example 1 (3%, based on the pulp), and the mixture is stirred for 5 minutes. 10 parts of a 1% strength rosin size solution are then added, 15 parts of a 1% strength aluminium solution are added after a further minute, and the mixture is diluted with 800 parts of water and stirred for a further 3 minutes.

A sheet of paper is formed from this pulp suspension on a manual sheet former, and the resulting sheet is pressed off in a manual press and dried on a drying cylinder at 100° C. for 10 minutes, being turned twice.

The paper dyeing thus obtained shows a neutral black with a good depth of colour and has a good fastness to bleeding and light.

EXAMPLE 3

30 parts of the liquid dyestuff preparation obtained according to Example 3 (dyestuff content about 5%) are diluted with a mixture of 61 parts of water and 9 parts of diethylene glycol. The ink thus obtained, with a dyestuff content of about 1.5%, produces prints in light- and wet-fast black shades on customary writing papers by means of a Hewlett-Packard DeskJet printer (DeskJet is a registered trademark of the Hewlett-Packard Company, U.S.A.).

Examples 4–8 are prepared analogously to Example 1 by employing a different amine:

| Example | Amine $HR^1$ or $HR^2$ | $\lambda_{max}$ [nm] ($H_2O$) |
|---|---|---|
| 4 | Triethylenetetramine | 583 |
| 5 | Tetraethylenepentamine | 582 |
| 6 | Pentaethylenehexamine | 587 |
| 7 | Aminoethylpiperazine | 580 |
| 8 | Polyethyleneimine | 592 |

Examples 9–17, which correspond to the general formula VII

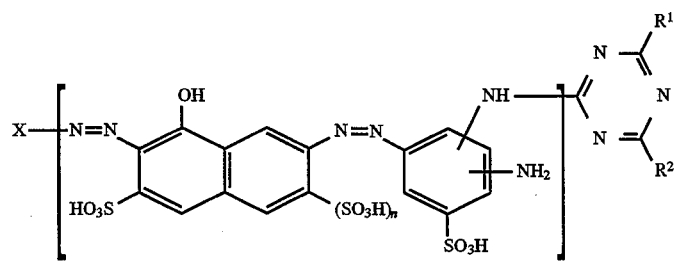

50

55 wherein X, n, $R^1$ and $R^2$ have the following meanings, are prepared analogously to Example 1.

| Ex. | X | Amine HR¹ or HR² | n | $\lambda_{max}$ [nm] (H$_2$O) |
|---|---|---|---|---|
| 9 | HO₃S—⟨phenyl⟩—N=N—⟨naphthyl-SO₃H⟩ | Tetraethylene-pentamine | 1 | 585 |
| 10 | HO₃S—⟨naphthyl⟩—N=N—⟨naphthyl-SO₃H⟩ | Hydroxyethyl-piperazine | 1 | 581 |
| 11 | HOOC—⟨phenyl⟩—N=N—⟨naphthyl-SO₃H⟩ | Aminoethyl-piperazine | 1 | 585 |
| 12 | HOOC—⟨phenyl⟩—N=N—⟨naphthyl-SO₃H⟩ | Pentaethylene-hexamine | 1 | 591 |
| 13 | HO₃S—⟨phenyl⟩—N=N—⟨naphthyl-SO₃H⟩ | Ethylpiperazine | 1 | 562 |
| 14 | HO₃S—⟨naphthyl⟩—N=N—⟨naphthyl-SO₃H⟩ | Ethylpiperazine | 0 | 564 |
| 15 | HO₃S—⟨phenyl⟩—N=N—⟨naphthyl-SO₃H⟩ | Ethylpiperazine | 0 | 559 |

-continued

| Ex. | X | Amine HR¹ or HR² | n | $\lambda_{max}$ [nm] ($H_2O$) |
|---|---|---|---|---|
| 16 | HO₃S—⟨⟩—N=N—(naphthyl with HO₃S) | Ethylpiperazine | 1 | 561 |
| 17 | HOOC—⟨⟩—N=N—(naphthyl with SO₃H) | Ethylpiperazine | 0 | 560 |

EXAMPLE 18

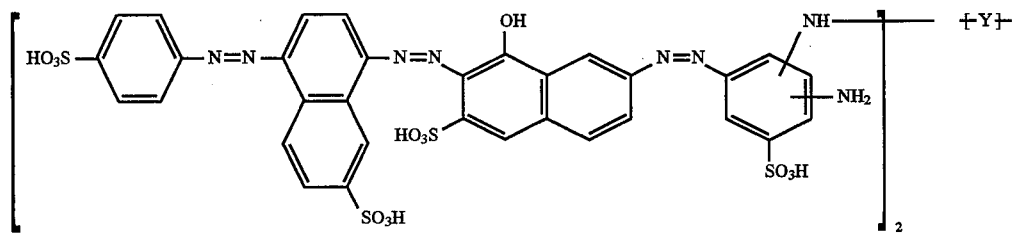

wherein
Y=

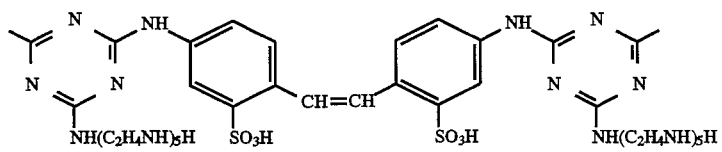

To
8 g of cyanuric chloride in
600 ml of ice-water are added dropwise
93 ml of sodium flavonate solution (~10% strength) at pH 2–2.5 in the course of 2 hours. After warming to room temperature,
39 g (75%) of dried aminotrisazo colour base (which is also employed in Example 1) are added. The pH is kept at 6.5 with 10% strength NaOH solution. The mixture is heated to 50° C. and kept at this temperature for 3 hours.
10.2 g of pentaethylenehexamine are added to this reaction mixture. The temperature is increased to 80° C. and maintained for 30 minutes. After cooling to room temperature, the pH is brought to 7.5 with HCl/H₂O and the product is filtered off with suction, washed with 5% strength NaCl solution and dried. 49 g of dyestuff are obtained, $\lambda_{max}(H_2O)$ 592 nm.

5 parts of this dyestuff are stirred into 80 parts of water and the pH is brought to 9.5 by addition of 2N sodium hydroxide solution. A total weight of 100 parts is established by addition of water, so that an approximately 5% strength liquid dyestuff preparation according to the invention of the above dyestuff is obtained. This can be used analogously to Example 1 for the preparation of inks according to Example 6, with which wet-fast shades are achieved by ink jet printing.

Examples 19–24, which correspond to the general formula VIII

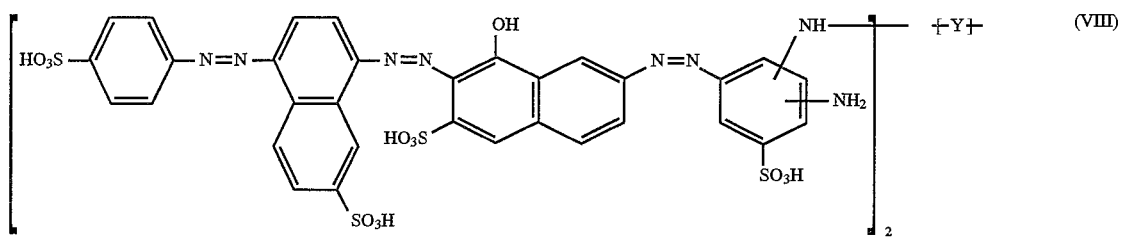

(VIII)

where Y=

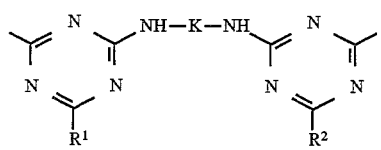

wherein,

K, R¹ and R² have the following meanings, are prepared analogously to Example 18:

| Ex. | K | Amine HR¹ or HR² | $\lambda_{max}$ [nm] ($H_2O$) |
|---|---|---|---|
| 19 | ![structure with SO3H, CH=CH, HO3S] | Polyethyleneamine | 595 |
| 20 | ![structure with HO3S] | Tetraethylenepentamine | 593 |
| 21 | ![structure with CH2-CH2, SO3H, HO3S] | Pentaethylenehexamine | 587 |
| 22 | ![structure N=N, O bridge] | $-NH-(CH_2)_3-N(CH_3)-CH_2CH_2-OH$ | 596 |
| 23 | ![structure NH-CO, CO2H] | Aminoethylpiperazine | 594 |
| 24 | ![structure NH-C(O)-NH, HO3S, SO3H] | Pentaethylenehexamine | 597 |

Examples 25–28, which correspond to the general formula VIII
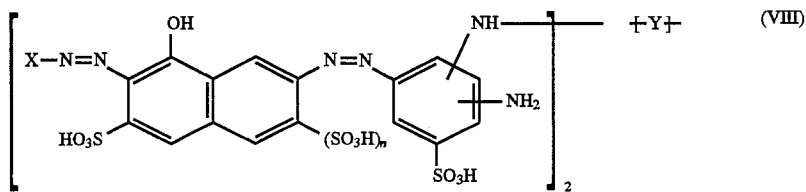
where
Y=
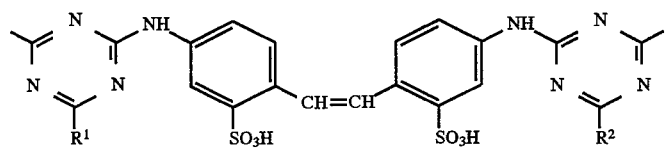
wherein
X, $R^1$, R and n have the following meanings, are prepared analogously to Example 18:
| Ex. | X | Amine $HR^1$ or $HR^2$ | n | $\lambda_{max}$ [nm] ($H_2O$) |
|---|---|---|---|---|
| 25 | HO₃S—⟨⟩—N=N—[naphthyl-SO₃H] | Pentaethylenehexamine | 1 | 594 |
| 26 | HO₃S—[naphthyl]—N=N—[naphthyl-SO₃H] | Morpholine | 1 | 590 |
| 27 | COOH—⟨⟩—N=N—[naphthyl-SO₃H] | Piperazine | 0 | 588 |

-continued

| Ex. | X | Amine HR$^1$ or HR$^2$ | n | $\lambda_{max}$ [nm] (H$_2$O) |
|---|---|---|---|---|
| 28 | 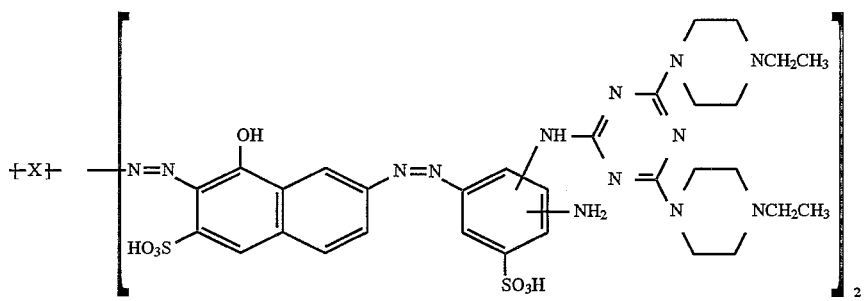 | Ethyl-piperazine | 0 | 589 |

EXAMPLE 29

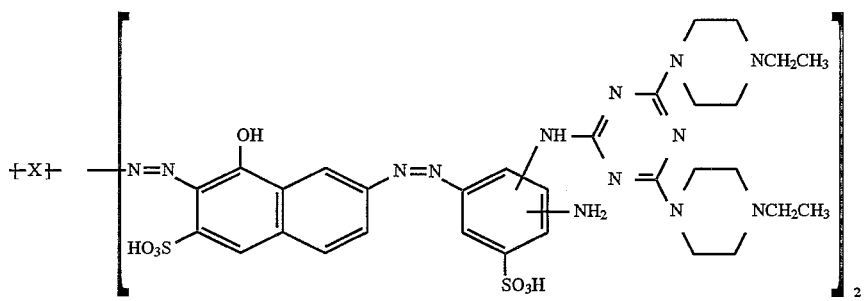

where
X=

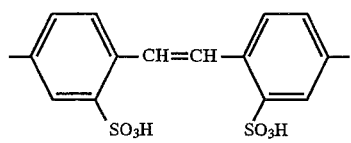

20 g of aminoazo dyestuff(~70%), prepared by tetrazotization of flavonic acid and coupling to 2-amino-8-hydroxynaphthalene-6-sulphonic acid, and further tetrazotization and coupling to 1,3-diaminobenzene-4-sulphonic acid are initially introduced into
100 ml of water, and
6 g of cyanuric chloride, suspended in
100 ml of ice-water, are added.

At the same time, the pH is kept at 6 with 5% strength NaOH solution and the mixture is warmed to room temperature in the course of 1 hour. After 3 hours at room temperature, 26 g of ethylpiperazine (corresponds to part formula HR$^1$ or HR$^2$) are added. The temperature is increased to 80° C. and maintained for 30 minutes.

After cooling to room temperature, the product is salted out with 53 g of NaCl, filtered off with suction, washed with 10% strength NaCl solution and then dried. 26 g of dyestuff are obtained, $\lambda_{max}$ (H$_2$O) 560 nm.

5 parts of this dyestuff are stirred into 80 parts of water and the pH is brought to 9.5 by addition of 2N sodium hydroxide solution. A total weight of 100 parts is established by addition of water, so that an approximately 5% strength liquid dyestuff preparation according to the invention of the above dyestuff is obtained. This can be used analogously to Example 1 for the preparation of inks according to Example 6 which produce wet-fast shades by ink jet printing.

Examples 30–34, which correspond to the general formula IX

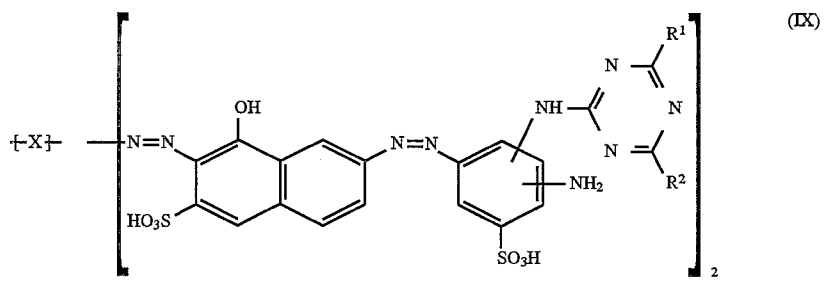 (IX)

wherein

X, R$^1$ and R$^2$ have the following meanings, are prepared analogously to Example 29:

| Ex. | X | Amine HR¹/HR² | $\lambda_{max}$ [nm] ($H_2O$) |
|---|---|---|---|
| 30 | 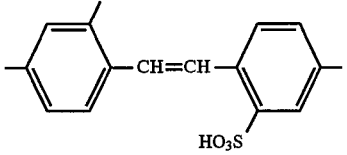 | Ethylenediamine | 563 |
| 31 | 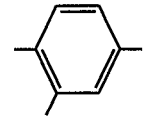 | Aminoethanol | 559 |
| 32 | 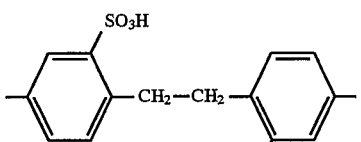 | Triethylenetetramine | 565 |
| 33 | 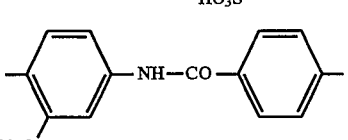 | Diethylenetriamine | 563 |
| 34 | 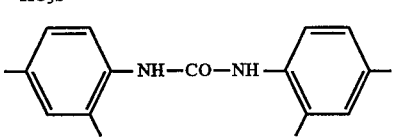 | Pentaethylenehexamine | 597 |

EXAMPLE 35

51 g of moist paste of the aminotrisazo dyestuff which has already been employed as the colour base in Example 1 (starting material) are initially introduced into 150 ml of water, and 2.9 g of 1,4-diisocyanatobenzene are added at room temperature. At the same time, the pH is kept at pH 8 by dropwise addition of 5% strength LiOH solution.

When the reaction has ended, the pH is brought to 6 with $HCl/H_2O$ and the product is filtered off with suction, washed with $H_2O$ and dried. 16.7 g of dyestuff, $\lambda_{max}(H_2O)$ 587 nm, of the formula

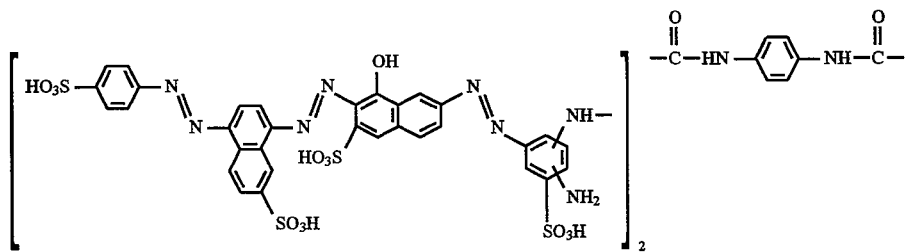

are obtained.

A liquid dyestuff preparation and ink were prepared analogously to Example 1g 2 and 3.

We claim:

1. An azo dyestuff of the formula (I)

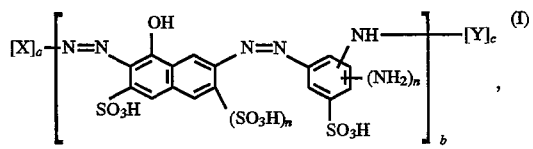

wherein

X denotes a radical of the formula (II)

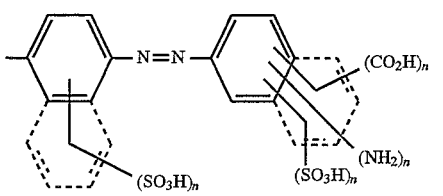

or represents a bivalent radical

and

Y represents a radical of the formula II

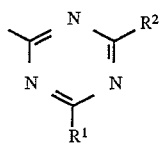

or represents a bivalent radical of the formulae IV to VIa

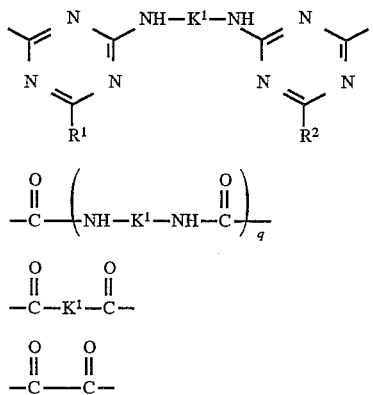

wherein n in each case independently of one another represents 0 or 1, q denotes 0 or 1, $R^1$ and $R^2$ independently of one another represent halogen, hydroxyl, $C_1$-$C_4$-alkoxy or an amino group, K denotes $C_6$-$C_{10}$-arylene, hetarylene, two $C_6$-$C_{10}$-arylene units which are independent of one another and are bonded directly to one another or are interrupted by hetarylene, $C_1$-$C_6$-alkylene, $C_2$-$C_6$-alkylidene or hetero atoms, or two $C_1$-$C_6$-alkylene and/or $C_2$-$C_6$-alkylidene units which are independent of one another and are bonded directly to one another or interrupted by hetarylene, $C_6$-$C_{10}$-arylene or hetero atoms, $K^1$ has the meaning of K or denotes $C_1$-$C_6$-alkylene or $C_2$-$C_6$-alkylidene, a, b and c independently of one another denote 1 or 2, a+c<4, a+b+c=3 or 5 and the free valencies of the radical X are in each case linked to the azo group and those of the radical Y are in each case linked to the amino group of the bivalent radical with the index b.

2. An azo dyestuff of the formula I according to claim 1, which correspond to the formula VII

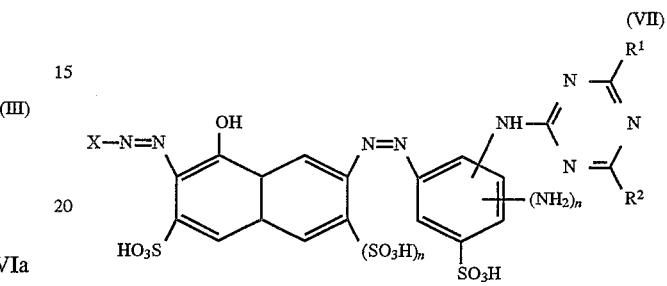

wherein $R^1$ and $R^2$ independently of one another denote an amino group and the monovalent radical X has the meaning according to claim 1.

3. An azo dyestuff of the formula I according to claim 1, which correspond to the formula VIII

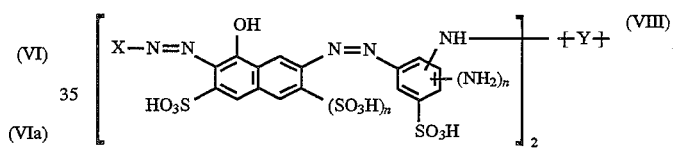

wherein

X has the meaning of the monovalent radical and

Y has the meaning of the bivalent radical according to claim 1.

4. An azo dyestuff of the formula I according to claim 1, which correspond to the formula IX

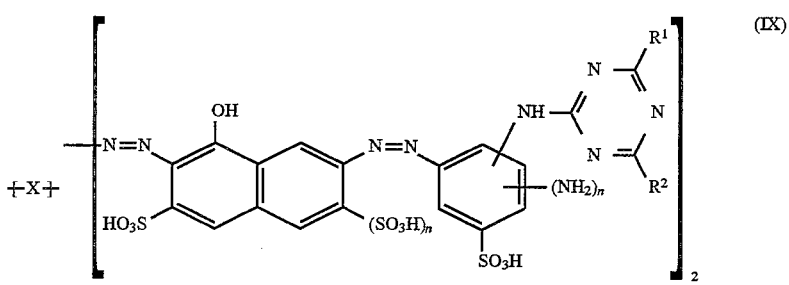

wherein $R^1$ and $R^2$ independently of one another represent an amino group and X has the meaning of the bivalent radical according to claim 1.

5. An azo dyestuff to claim 1, wherein X denotes a radical of the formulae IIa–IIf

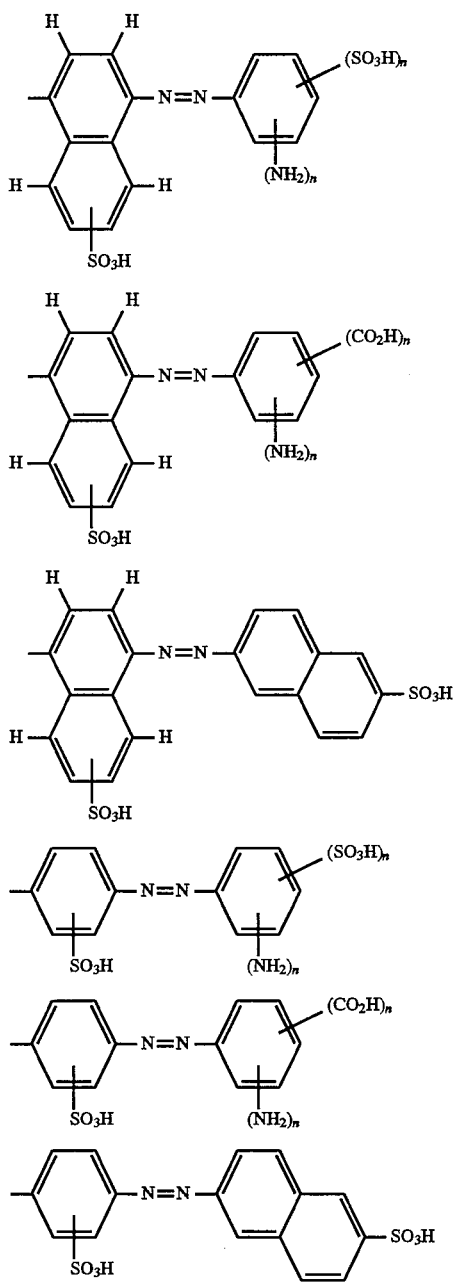

or represent a bivalent radical K, which has the meaning according to claim 1.

6. An azo dyestuff according to claim 1, wherein $R^1$ and $R^2$ independently of one another denote fluorine, chlorine, bromine or an amino group of the formula $NR^3R^4$, wherein $R^3$ denotes H or a $C_1$–$C_{10}$-alkyl, $C_1$–$C_{10}$-cycloalkyl or $C_6$–$C_{10}$-Ar-$C_1$–$C_{10}$-alkyl radical which is unsubstituted or substituted by carboxyl, hydroxyl, amino, sulpho, sulphato and/or $C_1$–$C_4$-alkoxy, $R^4$ has the meaning of $R^3$ or represents a $C_6$–$C_{10}$-aryl radical which is unsubstituted or substituted by hydroxyl, carboxyl, sulpho, $C_1$–$C_4$-alkyl and/or $C_1$–$C_4$-alkoxy, or $R^3$ and $R^4$, together with the nitrogen atom to which they are bonded, form a heterocyclic 5- or 6-membered ring, which optionally contains a further hetero atom.

7. An azo dyestuff according to claim 6, wherein $NR^3R^4$ represents $NH_2$, $NHCH_3$, $N(CH_3)_2$, $N(C_2H_5)_2$, $NHC_2H_5$, $NHCH_2CH_2OH$, $NHCH_2CH_2CH_2OCH_3$, $N(C_2H_4OH)_2$

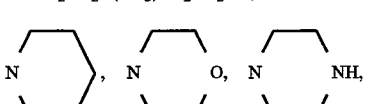

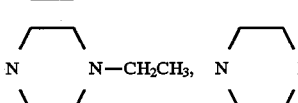

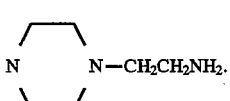

$HNCH_2CH_2OSO_3H$, $NHCH_2CH_2SO_3H$, $NHCH(CH_3)_2$,

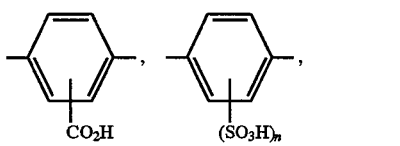

$NHCH_2CH_2COOH$, $N(C_2H_4OSO_3H)_2$, $NH(CH_2)_{10}COOH$, $NH(CH_2CH_2NH)_p$—$CH_2CH_2NH_2$ (p = 0–4), $NHCH_2CH_2N(CH_3)CH_2CH_2OH$,

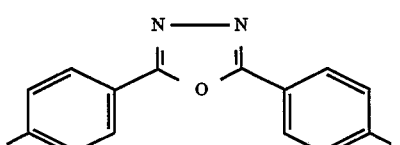

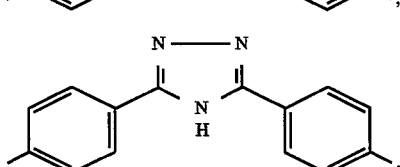

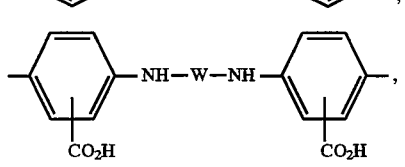

8. An azo dyestuff of the formula I according to claim 1, wherein the bivalent radical K denotes

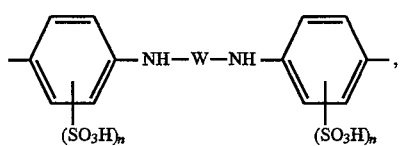

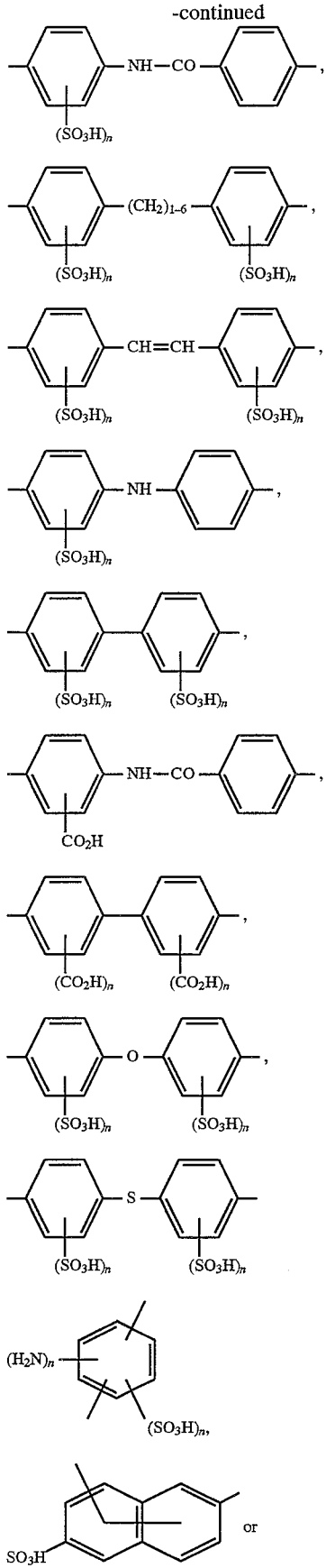
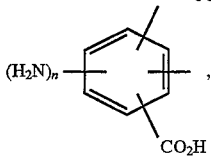
wherein in the case of several substituents having the index n per molecule, n in each case independently of one another represents 0 or 1, and
W represents
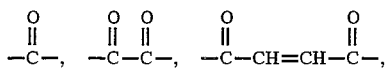
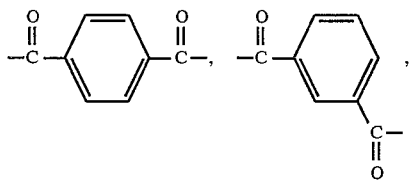
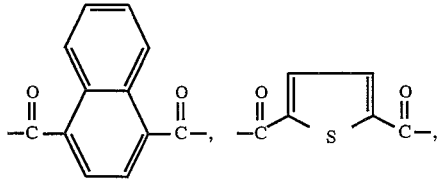
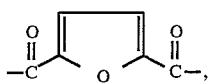
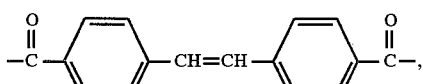
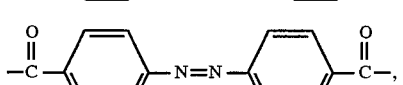
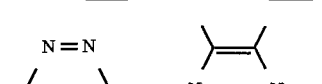
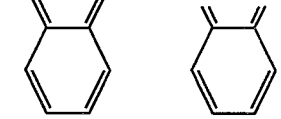
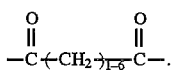
9. Process for the preparation of a dyestuff of the formula (I), wherein colour bases of the formula (X)
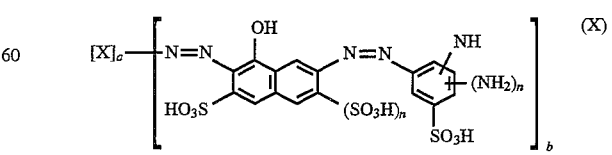
wherein
n and X have the meanings given in claim 1,
a=1 and b=1 if X represents a monovalent radical and b=2 if X represents a bivalent radical, are reacted with a compound of the formula XIa to XIe

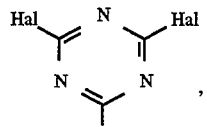 (XIa)

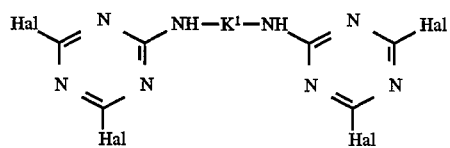 (XIb)

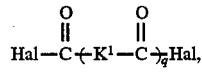 (XIc)

$$Hal-C-C-Hal$$
with O double-bonded above each C (XIe)

wherein $K^1$ and q have the meanings given in claim 1 and

Hal in each case independently of one another represents fluorine, chlorine or bromine, and optionally the products are reacted further to give compounds of the formula (I) wherein $R^1$ and $R^2$ denote hydroxyl, $C_1$–$C_4$-alkoxy or an amino group.

10. Process for dyeing cellulose-containing materials by applying thereto an azo dyestuff according to claim 1.

11. Liquid dyestuff preparations comprising at least one dyestuff according to claim 1.

* * * * *

UNITED STATES PATENT AND TRADEMARK OFFICE
CERTIFICATE OF CORRECTION

PATENT NO. : 5,637,679
DATED : June 10, 1997
INVENTOR(S) : Hassenruck, et al.

It is certified that error appears in the above-indentified patent and that said Letters Patent is hereby corrected as shown below:

Col. 27, line 15   After " of the formula " delete " II " and substitute -- III --

Signed and Sealed this

Seventeenth Day of February, 1998

Attest:

BRUCE LEHMAN

*Attesting Officer*   *Commissioner of Patents and Trademarks*